March 23, 1937.  C. H. TAYLOR  2,074,711
BRAKE
Original Filed Feb. 28, 1929  2 Sheets-Sheet 1

Inventor
CECIL H. TAYLOR
By Jerome R Cox
Attorney

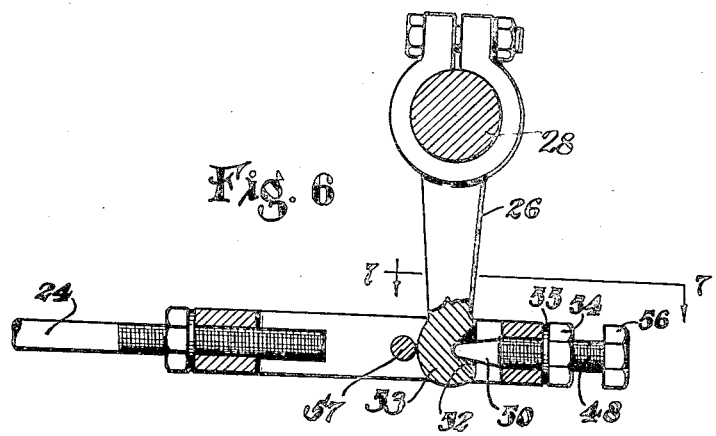
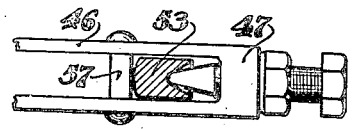
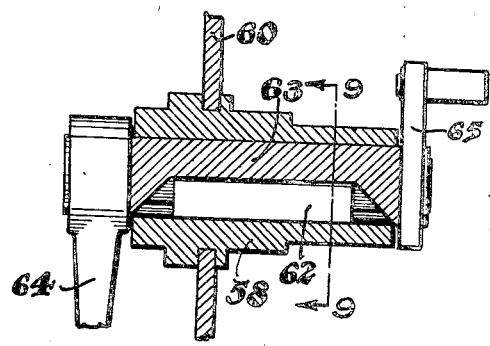
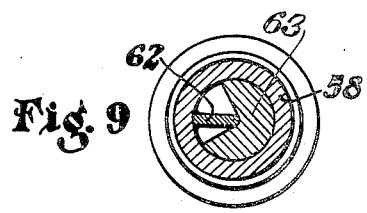

Patented Mar. 23, 1937 2,074,711

UNITED STATES PATENT OFFICE 2,074,711

BRAKE

Cecil H. Taylor, South Bend, Ind., assignor to Bendix Brake Company, South Bend, Ind., a corporation of Illinois Original application February 28, 1929, Serial No. 343,270, now Patent No. 1,999,217, April 30, 1935. Divided and this application February 11, 1935, Serial No. 5,927

2 Claims. (Cl. 308—2)

This application is a division of my co-pending application No. 343,270 filed February 28, 1929, now patent No. 1,999,217, granted April 30, 1935.

This invention relates to brakes and is illustrated as embodied in novel operating mechanism for a set of four-wheel brakes for an automobile.

The outstanding feature of my invention relates to the provision of a novel anti-friction bearing structure readily adapted to various parts of the brake connections such as the supports for the cross shaft adjacent the service pedal, the connection between the various pull rods and their co-operating lever arms, and the bearing for the cam shaft of the brake proper.

My novel bearing structure comprises a support of limited area, which support may take the form of a thin stamping to provide in effect what may be termed a "knife edge". The area of contact between the knife edge and the member to be supported is very limited, thus obviating an appreciable amount of friction between the parts as well as preventing failure of operation due to the ingress of foreign matter such as ice, dirt, etc.

A further feature of my invention resides in a novel arrangement of the bearings for a brake cross shaft in which a three point support for the shaft is provided. The shaft is preferably recessed to accommodate the three supporting elements, the points of contact between the latter and the shaft lying in a straight line. A further novelty resides in crooking or bending the shaft at the central bearing, thus obviating the necessity of recessing the shaft to its geometrical center.

Various minor but important features of novelty relate to the specific detail of the various bearings; to their adjustability; and to other desirable details of construction which will be apparent from the following description of the illustrative embodiments shown in the accompanying drawings, in which:

Figure 6 is a view showing my invention embodied in the connection between a crank or lever arm and a brake pull rod;

Figure 7 is a section of Figure 6 taken on the line 7—7;

Figure 8 is a view showing the adaptation of the invention to the bearing for a cam shaft; and Figure 9 is a diametric section through the bearing and shaft of Figure 8, and on the line 9—9 of Figure 8.

Figure 1:
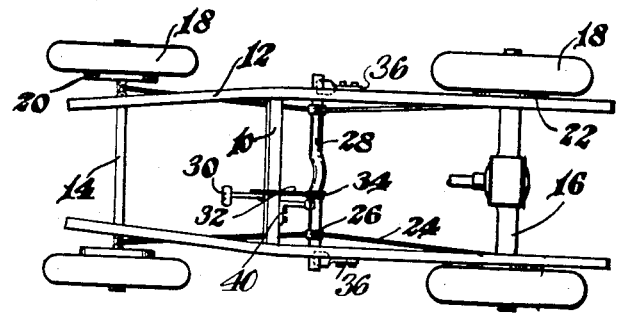
Figure 1 is a diagrammatic perspective of an automobile chassis embodying one form of the invention.

The chassis shown in Figure 1 includes the usual frame, ordinarily having one or more cross members 10 connecting the opposite side members 12, and which is supported by the usual springs (not shown) on front and rear axles 14 and 16, which in turn are carried by road wheels 18 having front brakes 20 and rear brakes 22. The brakes may be operated by tension rods or cables 24 connected to operating arms or levers 26 on a single heavy transverse shaft 28. The shaft may be operated by a service pedal 30 connected by means such as a link 32 to an arm 34 connected to the shaft.

Figure 2:
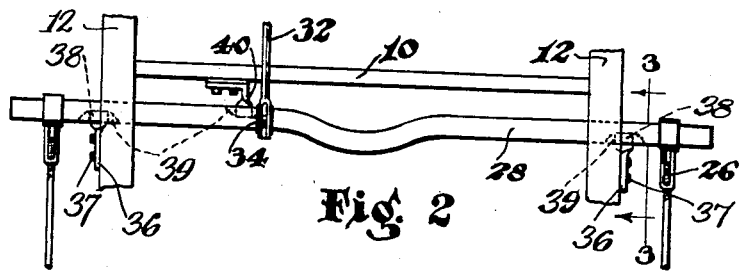
Figure 2 is a partial plan view of the chassis and brake cross shaft embodying the novel bearing structure disclosed in Figure 1.
Figure 3:
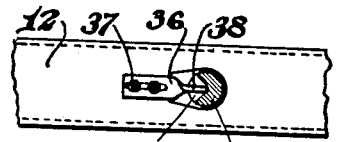
Figure 3 is a sectional view taken on the line 3—3 of Figure 2 showing one of the end bearings in detail.

The present invention has to do in one of its aspects with the supporting and arrangement of shaft 28 or its equivalent. In that form of the invention disclosed in Figures 1, 2 and 3 the shaft is straight save for the conventional bend to avoid the drive shaft. I propose to provide three points of support or three bearings for the shaft. The end bearings may comprise stampings 36 adjustably secured as by bolts 37 to the channel frame members 12, which stampings are preferably twisted at one end to provide a relatively narrow and thin blade member 38 extending at right angles to the body of the stamping. The blade portion 38 is adapted to fit within a recess 39, preferably V shaped, cut in the shaft; the end of the blade, preferably rounded, bearing upon the shaft at the apex of the recess, all as clearly disclosed in Figure 3.

The central bearing 40 is similar to that described, differing only in its being shaped as an angle member and adjustably secured to the frame cross member 10.

The contact points of the three "knife edge" or blade supports are arranged to lie in the same line at the geometrical center of the shaft to permit the rocking of the shaft and I prefer to mount the center bearing 40 immediately adjacent the arm 34 so that the bearing takes any bending stress on the shaft from the pedal, thus permitting a lighter shaft to be used. The shaft is furthermore extended through enlarged openings in the frame members 12, which members thus serve as safety or emergency bearings upon failure of the blade members.

Figure 4:
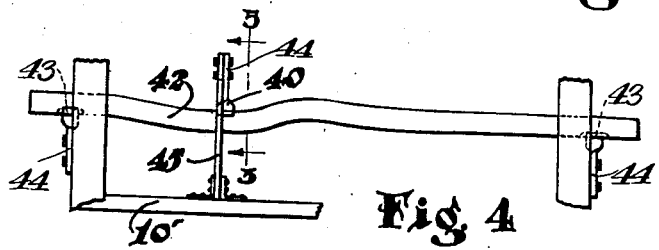
Figure 4 is a view similar to Figure 2 showing a modified form of shaft bearing structure and support for the central bearing.
Figure 5:
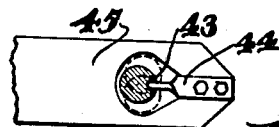
Figure 5 is a section taken through the shaft on the line 5—5 of Figure 4.

In that embodiment of the invention disclosed in Figures 4 and 5 the deep recessing of the shaft (with the consequent weakening) may be obviated by crooking or bending the shaft at 42 to permit the three aligned relatively shallow countersinks 43. In this form the central stamping or bearing member 44 is preferably adjustably secured to an extension piece 45 secured to the cross member 10', the enlarged opening in the extension providing a third emergency bearing.

As disclosed in Figures 6 and 7 the limited area bearing may be incorporated in the connection between a cross shaft lever member 26 and its pull rod 24. This connection takes the place of the usual clevis construction and may comprise parallel straps or links 46 connected at their ends by end members 47 preferably integral therewith. The pull rod may be adjustably connected to one end member 47 and the remaining member is preferably internally threaded to receive a stud 48 tapered at its inner end to provide a conical thrust head 50 preferably having a slightly rounded end to fit within a conical countersink 52 in the enlarged end 53 of the crank lever 26. A lock nut 54 and washer 55 preserve the adjustment of the stud which may be rotated by the integral nut 56 at its end. A stop pin 57 secured to the straps 46 serves to limit the movement of the crank to obviate rattle as well as preserve the adjustment.

In that embodiment disclosed in Figures 8 and 9, a tubular cam shaft bearing 58 fixedly secured to the backing plate 60 may be provided with a thin blade 62 welded thereto, which blade fits within a recess, preferably V shaped, in the cam shaft 63. The usual crank arm 64 and cam part 65 are secured to the ends of the cam shaft. In this embodiment it is to be observed that the blade member, which is preferably rounded at its end to fit the correspondingly rounded apex of the recess, serves to cut down the contact area between the shaft and its bearing 58 by the amount of the cut away portion. Friction between the relatively movable parts is thus lessened.

I have thus provided an efficient bearing structure which, by virtue of the limited contact area between the journal and journaled members appreciably reduces the friction between the parts as compared with conventional bearing structures. The "freezing" of the controls ofttimes occurring as a result of the ingress of dirt, low oil viscosity or the formation of ice at the bearings is to a large extent eliminated by my novel structure.

It is further to be noted that the conical countersink of Figure 6 may be effected by a simple drill press operation which is less expensive and more accurate than the usual machining or milling operation of a circular bearing. Furthermore the adjustable feature of the bearings permits ready alignment of the cross shaft with both the initial set and subsequent adjustment for wear.

While several illustrative embodiments have been described in detail, it is not my intention to limit the scope of the invention to those particular embodiments, or otherwise than by the scope of the appended claims.

I claim:

1. Brake operating connections comprising aligned bearing members having respective knife-edge contacts with a supported shaft in line with each other and which shaft is provided with a crooked portion at an intermediate bearing, the aforementioned shaft characterized by being provided with relatively shallow recesses to accommodate said bearing members.

2. Brake operating connections comprising aligned bearing members having their respective knife-edge contacts with a supported shaft in line with each other and which shaft is provided with a crooked portion at and extending on each side of the central bearing.

CECIL H. TAYLOR.